(12) United States Patent
Nader Vasconcelos et al.

(10) Patent No.: US 12,561,757 B2
(45) Date of Patent: Feb. 24, 2026

(54) IMAGE SUPER-RESOLUTION NEURAL NETWORKS

(71) Applicant: Google LLC, Mountain View, CA (US)

(72) Inventors: Cristina Nader Vasconcelos, Montreal (CA); Ahmet Cengiz Oztireli, Zurich (CH); Andrea Tagliasacchi, Toronto (CA); Kevin Jordan Swersky, Toronto (CA); Mark Jeffrey Matthews, Los Angeles, CA (US); Milad Olia Hashemi, San Francisco, CA (US)

(73) Assignee: Google LLC, Mountain View, CA (US)

( * ) Notice: Subject to any disclaimer, the term of this patent is extended or adjusted under 35 U.S.C. 154(b) by 309 days.

(21) Appl. No.: 18/379,519

(22) Filed: Oct. 12, 2023

(65) Prior Publication Data

US 2024/0135492 A1      Apr. 25, 2024

Related U.S. Application Data

(60) Provisional application No. 63/415,551, filed on Oct. 12, 2022.

(51) Int. Cl.
*G06T 3/4053* (2024.01)
*G06T 5/20* (2006.01)
*G06V 10/771* (2022.01)

(52) U.S. Cl.
CPC .............. *G06T 3/4053* (2013.01); *G06T 5/20* (2013.01); *G06V 10/771* (2022.01); *G06T 2207/10024* (2013.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 11,288,546 B2 * | 3/2022 | Lee | ..................... | G06F 18/2148 |
| 11,875,553 B2 * | 1/2024 | Won | ....................... | G06N 3/045 |

(Continued)

FOREIGN PATENT DOCUMENTS

| | | | | | |
|---|---|---|---|---|---|
| CN | 111062867 A | * | 4/2020 | ........... | G06T 3/4046 |
| CN | 112364981 A | * | 2/2021 | ............. | G06N 3/045 |

(Continued)

OTHER PUBLICATIONS

Alwani et al., "Fused-layer CNN Accelerators," Paper, Presented at 49th Annual IEEE/ACM International Symposium on Microarchitecture, Taipei, Taiwan, Oct. 15-19, 2016, 12 pages.

(Continued)

*Primary Examiner* — Jiangeng Sun
(74) *Attorney, Agent, or Firm* — Fish & Richardson P.C.

(57) ABSTRACT

Methods, systems, and apparatus, including computer programs encoded on a computer storage medium, for processing an input image using a super-resolution neural network to generate an up-sampled image that is a higher resolution version of the input image. In one aspect, a method comprises: processing the input image using an encoder subnetwork of the super-resolution neural network to generate a feature map; generating an updated feature map, comprising, for each spatial position in the updated feature map: applying a convolutional filter to the feature map to generate a plurality of features corresponding to the spatial position in the updated feature map, wherein the convolutional filter is parametrized by a set of convolutional filter parameters that are generated by processing data representing the spatial position using a hyper neural network; and processing the updated feature map using a projection subnetwork of the super-resolution neural network to generate the up-sampled image.

20 Claims, 6 Drawing Sheets

(56) References Cited

U.S. PATENT DOCUMENTS

| | | | | |
|---|---|---|---|---|
| 2017/0185871 A1* | 6/2017 | Zhang | .................. | G06V 10/454 |
| 2019/0080456 A1* | 3/2019 | Song | .................. | G06V 10/7715 |
| 2019/0164290 A1* | 5/2019 | Wang | ..................... | G06N 5/046 |
| 2019/0295228 A1* | 9/2019 | Liu | ...................... | H04N 19/139 |
| 2020/0211229 A1* | 7/2020 | Hwang | ..................... | G06T 3/06 |

FOREIGN PATENT DOCUMENTS

| | | | | |
|---|---|---|---|---|
| CN | 109447247 B | * | 11/2021 | ............. G06N 3/045 |
| KR | 102337412 B1 | * | 12/2021 | ........... G06T 3/4046 |

OTHER PUBLICATIONS

Anwar et al., "A deep journey into super-resolution: A survey," ACM Computing Surveys, May 2020, 53(3):1-34.

Bashir et al., "A comprehensive review of deep learning based single image super-resolution," PeerJ Computer Science, Jul. 2021, 7:e621, pp. 1-56.

Bevilacqua et al., "Low-complexity single-image super-resolution based on nonnegative neighbor embedding," Paper, Presented at Proceedings of the British Machine Vision Conference, Surrey, United Kingdom, Sep. 3-7, 2012, pp. 1-10.

Boulch, "ConvPoint: Continuous convolutions for point cloud processing," Computers & Graphics, May 2020, 88:24-34.

Chen et al., "Learning continuous image representation with local implicit image function," Paper, Presented at Proceedings of the IEEE/CVF Conference on Computer Vision and Pattern Recognition, Nashville, TN, Jun. 20-25, 2021, pp. 8628-8638.

Dai et al., "Second-order attention network for single image super-resolution," Paper, Presented at 2019 IEEE/CVF Conference on Computer Vision and Pattern Recognition, Long Beach, CA, Jun. 15-20, 2019, pp. 11065-11074.

Dong et al., "Image super-resolution using deep convolutional networks," IEEE Transactions on Pattern Analysis and Machine Intelligence, Feb. 2016, 38(2):1-14.

Dong et al., "Learning a deep convolutional network for image super-resolution," Paper, Presented at Computer Vision—European Conference on Computer Vision 2014, Zurich, Switzerland, Sep. 6-12, 2014; Lecture Notes in Computer Science, Aug. 2014, 8692:184-199.

Du et al., "Anchor-Based Plain Net for Mobile Image Super-Resolution," Paper, Presented at 2021 IEEE/CVF Conference on Computer Vision and Pattern Recognition Workshops, Nashville, TN, Jun. 19-25, 2021, pp. 1-9.

Github.io [online], "CUF: Continuous Upsampling Filters," Jun. 2023, retrieved on Nov. 19, 2024, retrieved from URL<https://cuf-paper.github.io/>, 5 pages.

Goodfellow et al., "Generative adversarial networks," Communications of the ACM, Oct. 2020, 63(11):139-144.

Ha et al., "HyperNetworks," CoRR, Submitted on Dec. 1, 2016, arXiv:1609.09106v4, pp. 1-29.

Hermosilla et al., "Monte Carlo convolution for learning on non-uniformly sampled point clouds," ACM Transactions on Graphics, Dec. 2018, 37(6):1-12.

Ho et al., "Denoising diffusion probabilistic models," Paper, Presented at 34th Conference on Neural Information Processing Systems, Vancouver, Canada, Dec. 6-12, 2020; Advances in Neural Information Processing Systems 33, Dec. 2020, pp. 1-12.

Hu et al., "Meta-SR: A magnification-arbitrary network for super-resolution," Paper, Presented at Proceedings of IEEE/CVF Conference on Computer Vision and Pattern Recognition, Long Beach, CA, Jun. 15-20, 2019, pp. 1575-1584.

Huang et al., "Single image super-resolution from transformed self-exemplars," Paper, Presented at Proceedings of the 2015 IEEE Conference on Computer Vision and Pattern Recognition, Boston, MA, Jun. 7-12, 2015, pp. 5197-5206.

Ignatov et al., "Real-Time Quantized Image Super-Resolution on Mobile NPUs, Mobile AI 2021 Challenge: Report," Paper, Presented at Computer Vision and Pattern Recognition, 2021 Mobile AI Workshop, Virtual, Jun. 20, 2021; CoRR, Submitted on May 17, 2021, arXiv:2105.07825v1, pp. 1-10.

Lee et al., "Local texture estimator for implicit representation function," Paper, Proceedings of the IEEE/CVF Conference on Computer Vision and Pattern Recognition, New Orleans, LA, Jun. 18-24, 2022, pp. 1929-1938.

Liang et al., "SwinIR: Image Restoration Using Swin Transformer," Paper, Presented at IEEE International Conference on Computer Vision Workshops, Montreal, Canada, Oct. 11-17, 2021, pp. 1833-1844.

Lim et al., "Enhanced Deep Residual Networks for Single Image Super-Resolution," Paper, Presented at the IEEE Conference on Computer Vision and Pattern Recognition Workshops, Honolulu, HI, Jul. 21-26, 2017, pp. 136-144.

Liu et al., "Swin transformer: Hierarchical vision transformer using shifted windows," Paper, Presented at Proceedings of the IEEE/CVF International Conference on Computer Vision, Montreal, Canada, Oct. 10-17, 2021, pp. 10012-10022.

Martin et al., "A database of human segmented natural images and its application to evaluating segmentation algorithms and measuring ecological statistics," Paper, Presented in Proceedings of the Eighth IEEE International Conference, Vancouver, Canada, Jul. 7-14, 2001, 8 pages.

Mildenhall et al., "NeRF: Representing Scenes as Neural Radiance Fields for View Synthesis," Paper, Presented at European Conference on Computer Vision, Glasgow, Scotland, Aug. 23-28, 2020; Lecture Notes in Computer Science, 2020, 12346; Communications of the ACM, Jan. 2022, 65(1):99-106.

Rahaman et al., "On the Spectral Bias of Neural Networks," Paper, Presented at Proceedings of the 36th International Conference on Machine Learning, Long Beach, CA, Jun. 9-15, 2019; PMLR 97:5301-5310, 10 pages.

Rahimi et al., "Random features for largescale kernel machines," Paper, Presented at 21st Conference on Neural Information Processing Systems, Vancouver, Canada, Dec. 3-6, 2007; Advances in Neural Information Processing Systems 20, Dec. 2007, pp. 1-8.

Romero et al., "CKconv: Continuous Kernel Convolution for Sequential Data," Paper, Presented at the Tenth International Conference on Learning Representations, Virtual Conference, Apr. 25-29, 2022, pp. 1-25.

Romero et al., "Flexconv: Continuous Kernel Convolutions with Differentiable Kernel Sizes," Paper, Presented at Tenth International Conference on Learning Representations, Virtual Conference, Apr. 25-29, 2022, pp. 1-24.

Saharia, "Image Super-Resolution via Iterative Refinement," IEEE Transactions on Pattern Analysis and Machine Intelligence, Sep. 12, 2022, 45(4):4713-4726.

Shi et al., "Real-time single image and video super-resolution using an efficient sub-pixel convolutional neural network," Paper, Presented at IEEE Conference on Computer Vision and Pattern Recognition, Las Vegas, NV, Jun. 27-30, 2016, pp. 1874-1883.

Tancik et al., "Fourier features let networks learn high frequency functions in low dimensional domains," Paper, Presented at 34th Conference on Neural Information Processing Systems, Vancouver, Canada, Dec. 6-12, 2020; Advances in Neural Information Processing Systems 33, Dec. 2020, pp. 1-11.

Timofte et al., "NTIRE 2017 Challenge on Single Image Super-Resolution: Methods and Results," Paper, Presented at Proceedings of the IEEE Conference on Computer Vision and Pattern Recognition Workshops, Honolulu, HI, Jul. 21-26, 2017, pp. 114-125.

Vaswani et al., "Attention is all you need," Paper, Presented at 31st Conference on Neural Information Processing Systems, Long Beach, CA, Dec. 4-9, 2017; Advances in Neural Information Processing Systems 30, Dec. 2017, pp. 1-11.

Wang et al., "Deep Learning or image super-resolution: A survey," IEEE Transactions on Pattern Analysis and Machine Intelligence, Oct. 2021, 43(10):3365-3387.

Wang et al., "ESRGAN: Enhanced Super-Resolution Generative Adversarial Networks," Paper, Presented at Computer Vision—European Conference on Computer Vision 2018 Workshops, Munich, Germany, Sep. 8-14, 2018; Lecture Notes in Computer Science, 2014, 8692:1-16.

(56) References Cited

OTHER PUBLICATIONS

Wu et al., "PointConv: Deep convolutional networks on 3d point clouds, " Paper, Presented at IEEE/CVF Conference on Computer Vision and Pattern Recognition, Long Beach, CA, Jun. 16-20, 2019, pp. 9621-9630.

Xie et al., "Neural fields in visual computing and beyond," CoRR, Submitted on Nov. 29, 2021, arXiv:2111.11426v3, 31 pages.

Zeyde et al., "On single image scale-up using sparse-representations," Paper, Presented at the 7th International Conference, Avignon, France, Jun. 24-30, 2010: Lecture Notes in Computer Science, 2011, 6920:711-730.

Zhang et al., "Image super-resolution using very deep residual channel attention networks," Paper, Presented at the Computer Vision—European Conference on Computer Vision 2018, Munich, Germany, Sep. 8-14, 2018; Lecture Notes in Computer Science, 2014, 8692:1-16.

Zhang et al., "Residual dense network for image restoration," IEEE Transactions on Pattern Analysis and Machine Intelligence, Jan. 2020, 43(7):2480-2495.

* cited by examiner

SUPER-RESOLUTION SYSTEM 100

GENERATING UP-SAMPLED IMAGE USING SUPER-RESOLUTION NEURAL NETWORK

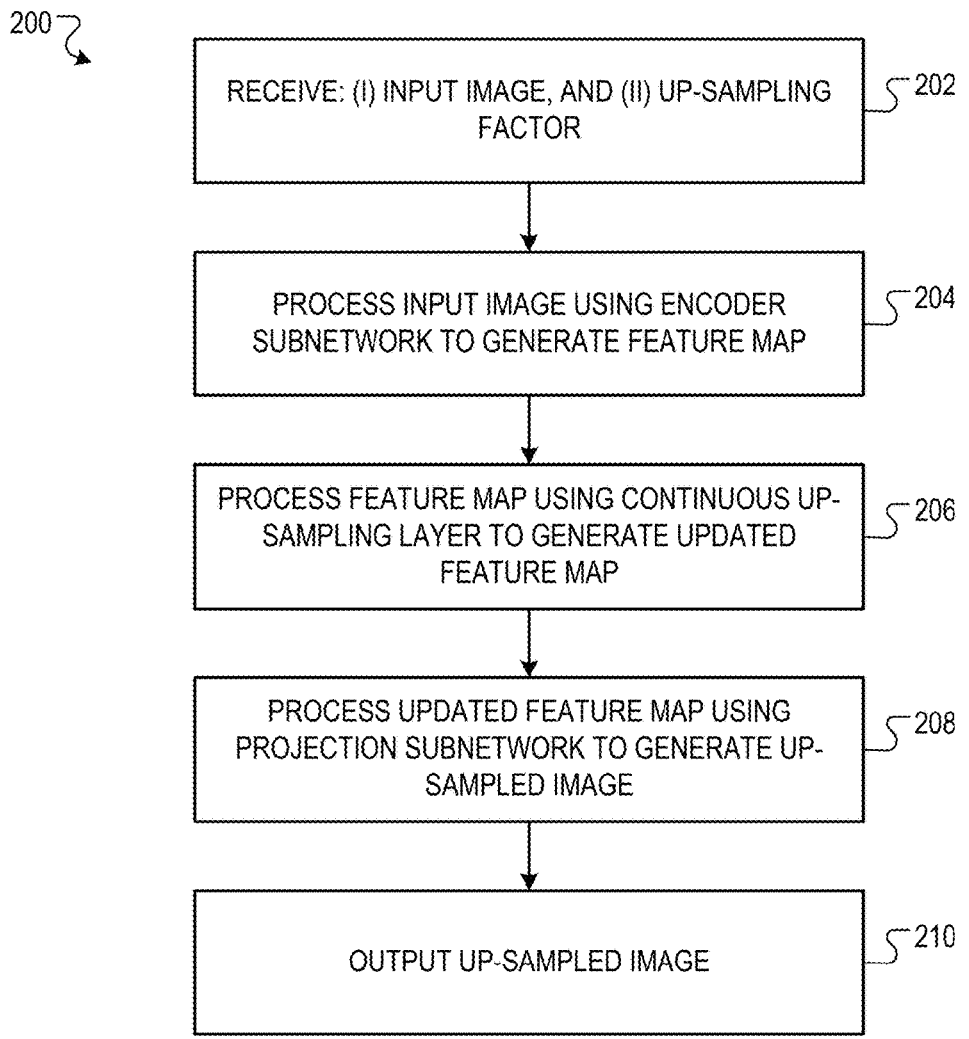

200

RECEIVE: (I) INPUT IMAGE, AND (II) UP-SAMPLING FACTOR ⟍202

PROCESS INPUT IMAGE USING ENCODER SUBNETWORK TO GENERATE FEATURE MAP ⟍204

PROCESS FEATURE MAP USING CONTINUOUS UP-SAMPLING LAYER TO GENERATE UPDATED FEATURE MAP ⟍206

PROCESS UPDATED FEATURE MAP USING PROJECTION SUBNETWORK TO GENERATE UP-SAMPLED IMAGE ⟍208

OUTPUT UP-SAMPLED IMAGE ⟍210

FIG. 2

GENERATING CONVOLUTIONAL FILTER PARAMETERS USING A HYPER NEURAL NETWORK

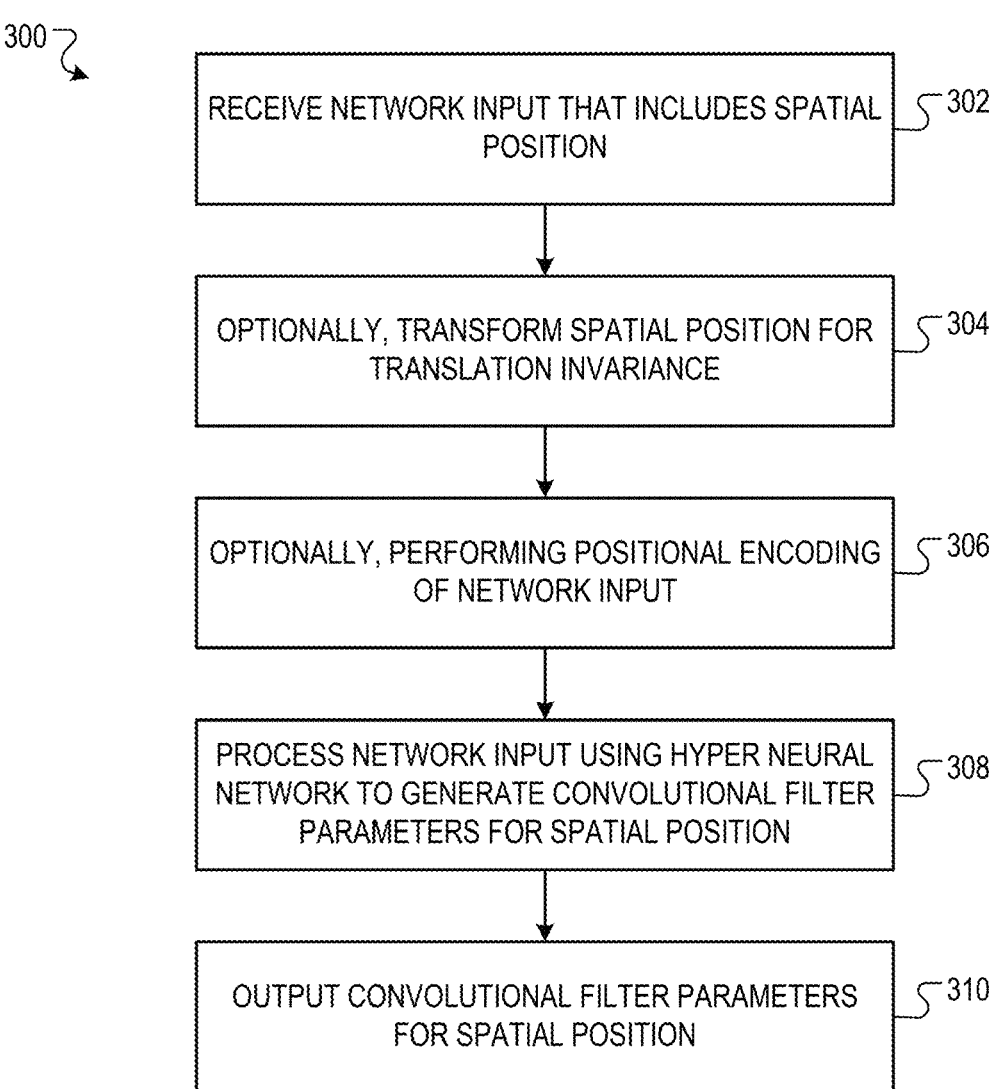

300

RECEIVE NETWORK INPUT THAT INCLUDES SPATIAL POSITION — 302

OPTIONALLY, TRANSFORM SPATIAL POSITION FOR TRANSLATION INVARIANCE — 304

OPTIONALLY, PERFORMING POSITIONAL ENCODING OF NETWORK INPUT — 306

PROCESS NETWORK INPUT USING HYPER NEURAL NETWORK TO GENERATE CONVOLUTIONAL FILTER PARAMETERS FOR SPATIAL POSITION — 308

OUTPUT CONVOLUTIONAL FILTER PARAMETERS FOR SPATIAL POSITION — 310

FIG. 3

JOINTLY TRAINING THE SUPER-RESOLUTION NEURAL NETWORK AND THE HYPER NEURAL NETWORK

400

RECEIVE TRAINING IMAGES     402

GENERATE TRAINING EXAMPLES BASED ON TRAINING IMAGES     404

JOINTLY TRAIN SUPER-RESOLUTION NEURAL NETWORK AND HYPER NEURAL NETWORK ON TRAINING EXAMPLES     406

EXAMPLE OF IMAGE SUPER-RESOLUTION

×1 ×1.5 ×2 ×2.5 ×3 ×3.5 ×4 ×4.5 ×5

IMAGE SUPER-RESOLUTION NEURAL NETWORKS

CROSS-REFERENCE TO RELATED APPLICATION

This application claims priority under 35 U.S.C. 119 to Provisional Application No. 63/415,551, filed Oct. 12, 2022, which is incorporated by reference.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification generally describes a system implemented as computer programs on one or more computers in one or more locations that performs image super-resolution.

According to one aspect, there is provided a method performed by one or more computers, the method comprising: receiving an input image; processing the input image using a super-resolution neural network to generate an up-sampled image that is a higher resolution version of the input image, comprising: processing the input image using an encoder subnetwork of the super-resolution neural network to generate a feature map; generating an updated feature map, comprising, for each spatial position in the updated feature map: applying a convolutional filter to the feature map at the spatial position to generate a plurality of features corresponding to the spatial position in the updated feature map, wherein the convolutional filter is parametrized by a set of convolutional filter parameters that are generated by processing data representing the spatial position using a hyper neural network; and processing the updated feature map using a projection subnetwork of the super-resolution neural network to generate the up-sampled image.

In some implementations, the hyper neural network is configured to receive an input comprising an input spatial position, wherein the input spatial position is selected from a continuous space of possible spatial positions.

In some implementations, the hyper neural network is configured to receive an input that comprises an up-sampling factor.

In some implementations, the up-sampling factor is selected from a continuous range of possible up-sampling factors.

In some implementations, the up-sampling factor defines a ratio of: (i) a resolution of the up-sampled image, and (ii) a resolution of the input image.

In some implementations, the hyper neural network is configured to receive an input that comprises an index of one or more convolutional filter parameters; and the hyper neural network is configured to generate an output that comprises one or more convolutional filter parameters corresponding to the index included in the input to the hyper neural network.

In some implementations, processing data representing the spatial position using the hyper neural network to generate the convolutional filter comprises, for each convolutional filter parameter in the convolutional filter: processing an input comprising: (i) data representing the spatial position, and (ii) an index corresponding to the convolutional filter parameter, using the hyper neural network to generate the convolutional filter parameter corresponding to the index.

In some implementations, the hyper neural network is configured to apply positional encoding to inputs to the hyper neural network.

In some implementations, the positional encoding is a cosine positional encoding.

In some implementations, for each spatial position in the updated feature map, the convolutional filter corresponding to the spatial position is a two-dimensional convolutional filter.

In some implementations, processing the input image using the encoder subnetwork of the super-resolution neural network to generate the feature map comprises: processing the input image to generate a feature map having a same resolution as the input image; and transforming the feature map to have a same resolution as the up-sampled image.

In some implementations, transforming the feature map to have the same resolution as the up-sampled image comprises up-sampling the feature map using nearest-neighbor interpolation.

In some implementations, processing the input image to generate a feature map having a same resolution as the input image comprises unfolding the feature map to augment each spatial position in the feature map with features from neighboring spatial positions in the feature map.

In some implementations, processing the updated feature map using the projection subnetwork of the super-resolution neural network to generate the up-sampled image comprises, for each spatial position in the updated feature map: processing the plurality of features corresponding to the spatial position in the updated feature map using the projection subnetwork to generate one or more intensity values of a pixel at the spatial position in the up-sampled image.

In some implementations, the input image is a two-dimensional color image.

In some implementations, the input image comprises a medical image.

In some implementations, the method further comprises: determining gradients of a super-resolution objective function with respect to: (i) a set of parameters of the super-resolution neural network, and (ii) a set of parameters of the hyper neural network, wherein the super-resolution objective function measures an error in the up-sampled image; and updating current values of: (i) the set of parameters of the super-resolution neural network, and (ii) the set of parameters of the hyper neural network, using the gradients.

In some implementations, updating current values of: (i) the set of parameters of the super-resolution neural network, and (ii) the set of parameters of the hyper neural network, using the gradients comprises backpropagating the gradients through the super-resolution neural network and the hyper neural network.

According to another aspect, there is provided a system comprising: one or more computers; and one or more storage devices communicatively coupled to the one or more computers, wherein the one or more storage devices store instructions that, when executed by the one or more computers, cause the one or more computers to perform operations comprising: receiving an input image; processing the input image using a super-resolution neural network to generate an up-sampled image that is a higher resolution version of the input image, comprising: processing the input image using an encoder subnetwork of the super-resolution neural network to generate a feature map; generating an updated feature map, comprising, for each spatial position in the updated feature map: applying a convolutional filter to the feature map to generate a plurality of features corresponding to the spatial position in the updated feature map, wherein the convolutional filter is parametrized by a set of convolutional filter parameters that are generated by processing data representing the spatial position using a hyper neural network; and processing the updated feature map using a projection subnetwork of the super-resolution neural network to generate the up-sampled image.

According to another aspect, there are provided one or more non-transitory computer storage media storing instructions that when executed by one or more computers cause the one or more computers to perform operations comprising: receiving an input image; processing the input image using a super-resolution neural network to generate an up-sampled image that is a higher resolution version of the input image, comprising: processing the input image using an encoder subnetwork of the super-resolution neural network to generate a feature map; generating an updated feature map, comprising, for each spatial position in the updated feature map: applying a convolutional filter to the feature map to generate a plurality of features corresponding to the spatial position in the updated feature map, wherein the convolutional filter is parametrized by a set of convolutional filter parameters that are generated by processing data representing the spatial position using a hyper neural network; and processing the updated feature map using a projection subnetwork of the super-resolution neural network to generate the up-sampled image.

Particular embodiments of the subject matter described in this specification can be implemented so as to realize one or more of the following advantages.

The super-resolution neural network described in this specification can perform image super-resolution, i.e., by processing an input image to generate an up-sampled image that is a higher-resolution version of the input image. As part of processing an input image to perform image super-resolution, the super-resolution neural network can apply a set of convolutional filters generated by a hyper neural network to a feature map derived from the input image.

The hyper neural network can efficiently encode a continuous family of convolutional filters appropriate for performing super-resolution in a limited number of hyper neural network parameters. Parametrizing the convolutional filters used for image super-resolution using the hyper neural network can enable a significant reduction in the memory footprint of the super-resolution neural network, e.g., a reduction by a factor of 40-fold or more.

The hyper neural network can be jointly trained along with the super-resolution neural network to optimize a super-resolution objective function. Training the hyper neural network in this manner has the effect of adapting the continuous family of convolutional filters encoded in the parameters of the hyper neural network to optimize the image super-resolution performance achieved by the super-resolution neural network. After being jointly trained along with the hyper neural network, the super-resolution neural network can achieve a performance comparable to or superior to conventional systems while being significantly more memory efficient.

The super-resolution neural network can be configured to receive an input up-sampling factor defining a desired ratio of the resolution of the up-sampled image to the original input image. The up-sampling factor can be selected from a continuous range of possible values, thus allowing the super-resolution neural network to directly generate an up-sampled image at any desired resolution. In contrast, some conventional super-resolution systems can only up-scale by integer factors. Thus, to achieve certain target image resolutions, these conventional systems are required to up-sample to an integer factor and then down-sample as necessary to achieve the target image resolution. The super-resolution neural network can achieve higher super-resolution quality while reducing consumption of computational resources compared to some conventional systems by obviating the need to perform integer up-sampling followed by down-sampling.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flow diagram of an example process for generating an up-sampled image using a super-resolution neural network.

FIG. 3 is a flow diagram of an example process for generating one or more convolutional filter parameters for a spatial position in a feature map using a hyper neural network.

Like reference numbers and designations in the various drawings indicate like elements.

DETAILED DESCRIPTION

Figure 1:
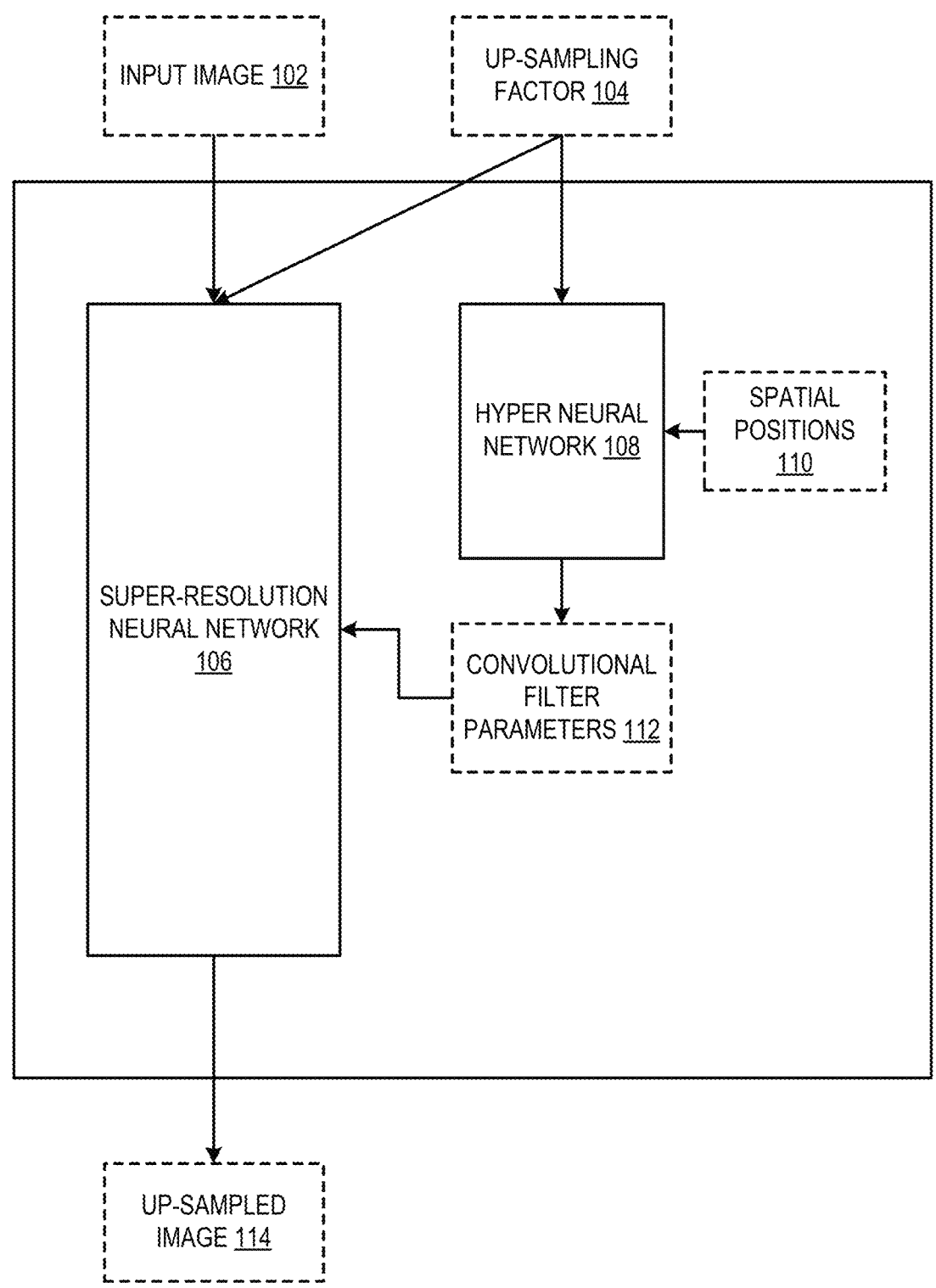
FIG. 1 shows an example super-resolution system.

FIG. 1 shows an example super-resolution system 100. The super-resolution system 100 is an example of a system implemented as computer programs on one or more computers in one or more locations in which the systems, components, and techniques described below are implemented.

The super-resolution system 100 is configured to process an input image 102 and an up-sampling factor 104 to generate an up-sampled image 114.

The up-sampled image 114 is a higher resolution version of the input image 102. In particular, the up-sampled image 114 is an image that has been up-sampled from the initial resolution of the input image 102 in accordance with the up-sampling factor 104. The up-sampled image 114 can show the same content as the original input image 102, but with greater detail and clarity.

The input image 102 can be any appropriate type of image. For instance, the input image 102 can be a satellite image (e.g., generated by one or more cameras on a satellite), or an astronomical image (e.g., generated using a telescope), or a medical image (e.g., an ultrasound (US) image, or a computed tomography (CT) image, or a magnetic resonance image (MRI), or a histological image, and so forth), or a hyperspectral image, or an image captured by a camera located on an agent (e.g., a robotic agent or an autonomous vehicle), or a microscopy image, or an image captured by a camera of a user device (e.g., a smartphone or tablet), or a video frame from a video, and so forth.

The up-sampling factor 104, which can be a positive scalar having a value greater than one, can characterize a ratio of: (i) the resolution of the up-sampled image, and (ii) the resolution of the input image 102. In particular, increasing the up-sampling factor 104 can cause an increase in the resolution of the up-sampled image 114 relative to the resolution of the input image 102.

For instance, the input image 102 can be a two-dimensional (2D) image represented as an array of numerical values having dimensionality H×W×3, where H is the height of the image, W is the width of the image, and 3 is the number of color channels, e.g., red-green-blue (RGB) color channels.

In this example, the up-sampled image 114 can be a 2D image represented as an array of numerical values having dimensionality [sH]×[sW]×3, where s is the up-sampling factor, and where [•] is an appropriate integer quantization operation, e.g., a floor operation.

Similarly, the input image 102 can be a three-dimensional (3D) image represented as an array of numerical values having dimensionality H×W×D×3 (where H, W are defined as above and D is the depth of the image), and the up-sampled image 114 can be a 3D image represented as an array of numerical values having dimensionality [sH]×[sW]×[sD]×3, where (as above) [•] is an appropriate integer quantization operation, e.g., a floor operation.

The up-sampled image 114 can include a greater number of pixels (or voxels) than the input image 102. For instance, if the input image 102 is a 2D image, then the number of pixels in the up-sampled image 114 can scale quadratically with the scaling factor.

The up-sampling factor 104 can have a fixed, static value (e.g., or 2, or 3, or 4), or can have a value that is selected (e.g., by a user) from a continuous range of possible up-sampling factors. For instance, the up-sampling factor can be any scalar value greater than one, such that the continuous range of possible up-sampling factors is $(1, \infty)$. In some cases, the super-resolution system can place an upper bound B on the value of the up-sampling factor, such that the continuous range of possible up-sampling factors is $(1, B]$. More generally, the up-sampling factors are not restricted to being integer values, but rather, can be any value selected from a range of continuous values. Thus the system 100 can perform super-resolution by non-integer up-sampling factors, such as 2.5×super-resolution, or 3.3×super-resolution, or 4.1×super-resolution.

The system 100 can receive the input image 102 and the up-sampling factor 104, e.g., through an application programing interface (API), graphical user interface (GUI), or other appropriate interface made available by the system 100.

The system 100 can provide the up-sampled image 114, e.g., for storage in a memory, or for transmission over a data communication network, or for presentation on a display of a user device.

The super-resolution system 100 can be implemented in any appropriate location, e.g., on a user device (e.g., a mobile device, e.g., a smartphone, tablet, or personal computer), or in a data center, or in a cloud environment.

The system 100 can be used in any of a variety of possible applications. A few example applications of the super-resolution system 100 are described next.

In some implementations, up-sampled images 114 generated by the system 100 are provided for processing by a downstream image analysis system. The image analysis system can be configured to perform any of a variety of image analysis tasks, e.g., image classification or image segmentation. Processing up-sampled images generated by the system 100, i.e., rather than the original lower-resolution images, can improve the accuracy and performance of the image analysis system.

In some implementations, the system 100 can be used as part of an image decompression system. For instance, an image compression system can down-sample an input image to generate a lower resolution version of the input image, e.g., that occupies less space in memory, or that can be more effectively compressed using an entropy encoding technique. Data representing the down-sampled image can be stored in a memory, or transmitted across a data communication network. The image decompression system can obtain the data representing the down-sampled image, and process the down-sampled image using the super-resolution system 100 to recover (an approximation of) the original input image.

In some implementations, the system 100 can be made available to users as an application, e.g., as a standalone application or as part of a broader application available on a user device, e.g., a smartphone or personal computer. For instance, the application can enable users to select images to be up-sampled, e.g., from an image library associated with a profile of the user, and the application can provide the up-sampled images, e.g., for storage in the image library or in another appropriate location.

The system 100 can include a super-resolution neural network 106 and a hyper neural network 108, which are each described in more detail next (and throughout this specification).

The super-resolution neural network 106 is configured to receive a network input that includes the input image 102 and the up-sampling factor 104, e.g., by an input layer of the super-resolution neural network 106, to process the network input by a collection of hidden layers, and to generate the up-sampled image 114, e.g., as an output of an output layer of the super-resolution neural network 106.

The super-resolution neural network 106 can include a neural network layer, referred to for convenience as a "continuous up-sampling layer," that is configured to process a layer input that includes a feature map derived from the input image 102 to generate a layer output that includes an updated feature map. In particular, the continuous up-sampling layer applies a respective convolutional filter to each spatial position in the feature map in order to generate the updated feature map. For each spatial position in the feature map, the convolutional filter applied at the spatial position in the feature map is parametrized by a set of convolutional filter parameters 112 having values that are generated by processing data representing the spatial position using the hyper neural network 108.

An example process for processing an input image using the super-resolution neural network to generate an up-sampled image is described in more detail with reference to FIG. 2.

The hyper neural network 108 is configured to receive a network input that includes data identifying a spatial position 110 in the feature map that is processed by the continuous up-sampling layer. Optionally, the network input to the hyper neural network 108 can include additional data, such as data identifying the up-sampling factor 104. The hyper neural network 108 processes the network input to generate a respective value for each convolutional filter parameter in a set of convolutional filter parameters corresponding to the spatial position 110 identified in the network input.

An example process for processing data defining a spatial location in a feature map using the hyper neural network 108 to generate values of a set of convolutional filter parameters is described in more detail with reference to FIG. 3. The hyper neural network can efficiently encode a continuous family of convolutional filters appropriate for performing super-resolution in a limited number of hyper neural network parameters. Parametrizing the convolutional filters used for image super-resolution using the hyper neural network can enable a significant reduction in the memory footprint of the super-resolution neural network, e.g., a reduction by a factor of 40-fold or more.

The system 100 jointly trains the super-resolution neural network 106 and the hyper neural network 108 to optimize an objective function that measures an error between: (i) up-sampled images 114 generated using the super-resolution neural network 106 and the hyper neural network 108, and (ii) ground truth up-sampled images. An example process for jointly training the super-resolution neural network and the hyper neural network 108 is described in more detail with reference to FIG. 4.

During training, the set of neural network parameters of the hyper neural network 108 are iteratively adjusted, and consequently the values of the sets of convolutional filter parameters 112 generated by the hyper neural network 108 vary over the course of training. After training, the values of the set of neural network parameters of the hyper neural network may be fixed. Thus, for a given up-sampling factor and given up-sampled image resolution, the system 100 can optionally precompute the values of the convolutional filter parameters 112 used by the continuous up-sampling layer. For the given up-sampling factor and up-sampled image resolution, the continuous up-sampling layer can use the precomputed values of the convolutional filter parameters rather than relying on the values of the convolutional filter parameters being dynamically generated using the hyper neural network 108. Further, as will be described in more detail below, the convolutional filter parameter values generated by the hyper neural network can have periodicity, such that the same convolutional filter parameter values are produced for multiple spatial locations in the feature map processed by the continuous up-sampling layer. Therefore the system 100 can precompute and store a number of convolutional filters that is significantly lower than the number of spatial positions in the feature map.

Optionally, the super-resolution neural network 106 can include multiple continuous up-sampling layers, and the system 100 can include a respective hyper neural network 108 for each continuous up-sampling layer.

The super-resolution neural network 106 and the hyper neural network 108 can each have any appropriate neural network architecture that enables the neural networks to perform their described functions. For instance, the respective neural network architectures of the super-resolution neural network 106 and the hyper neural network 108 can each include any appropriate types of neural network layers (e.g., fully connected layers, convolutional layers, attention layers, and so forth) in any appropriate number (e.g., 5 layers, 10 layers, or 50 layers) and connected in any appropriate configuration (e.g., as a directed graph of layers).

Respective example architectures of the neural networks 106 and 108 are described in more detail below with reference to FIG. 5.

FIG. 2 is a flow diagram of an example process 200 for generating an up-sampled image using a super-resolution neural network. For convenience, the process 200 will be described as being performed by a system of one or more computers located in one or more locations. For example, a super-resolution system, e.g., the super-resolution system 100 of FIG. 1, appropriately programmed in accordance with this specification, can perform the process 200.

The system receives an input image and an up-sampling factor (202). The up-sampling factor can be a numerical value greater than one that is drawn from a continuous range of possible up-sampling factors. The up-sampling factor can be an integer value or a non-integer value.

The system processes the input image, using an encoder subnetwork of the super-resolution neural network, to generate a feature map (204). For instance, to generate the feature map, the encoder subnetwork can first process the input image to generate an initial feature map having: (i) the same spatial resolution as the input image, and (ii) any appropriate number of feature channels.

The encoder subnetwork can then transform the initial feature map to a feature map having the same resolution as the output up-sampled image, e.g., by up-sampling the initial feature map using nearest neighbor interpolation or bilinear interpolation. In a particular example, the initial feature map can be represented as an array of numerical values having dimensionality $H \times W \times C$, where H is the height of the input image, W is the width of the input image, and C is the number of feature channels. The initial feature map can be transformed (e.g., through an appropriate interpolation technique) to a feature map that can be represented as an array of numerical values having dimensionality $[sH] \times [sW] \times C$, where $[\bullet]$ is an appropriate integer quantization operation, e.g., a floor operation.

Optionally, after generating the initial feature map, the encoder subnetwork can unfold the initial feature map to augment each spatial position in the initial feature map with features from neighboring spatial positions in the initial feature map, e.g., with features from a $k \times k$ spatial neighborhood of the spatial position. After unfolding $k \times k$ spatial neighborhoods, the initial feature map can be represented as an array of numerical values having dimensionality $H \times W \times C \times k^2$, i.e., where each spatial position in the initial feature map is associated with $C \times k^2$ features. Unfolding the initial feature map can enable the system to implement depth-wise spatial convolutions as dot products, as will be described in more detail below. A feature map resulting from transforming the unfolded initial feature map to the resolution of the up-sampled image can be represented as an array of numerical values having dimensionality $[sH] \times [sW] \times C \times k^2$.

The encoder subnetwork can have any appropriate neural network architecture, including any appropriate types of neural network layers (e.g., fully connected layers, convolutional layers, attention layers, and so forth) in any appropriate number (e.g., 3 layers, or 5 layers, or 10 layers) and connected in any appropriate configuration (e.g., as a directed graph of layers). A particular example architecture of the encoder subnetwork is illustrated with reference to FIG. 5.

The system processes the feature map using a continuous up-sampling layer of the super-resolution neural network to generate an updated feature map (206).

More specifically, for each spatial position in the feature map, the continuous up-sampling layer can apply a respective convolutional filter to the feature map at the spatial position to generate a set of features corresponding to the spatial position in the updated feature map.

In one example, at each spatial position, the feature map at the spatial position is associated with $C \times k^2$ features (e.g., as a result of unfolding the initial feature map, as described above), and the convolutional filter at the spatial position is parametrized by $C \times k^2$ parameters. In this example, the continuous up-sampling layer can apply the convolutional filter to the feature map at the spatial position by performing a channel-wise inner product between the convolutional filter and the feature map at the spatial position, e.g., to generate C feature channels at the spatial position in the updated feature map. That is, the continuous up-sampling layer can generate feature channels $\{f(x, c)\}_{c=1}^{C}$, where x denotes the spatial position and c denotes the feature channel, in according with the equation:

$$f(x,c) = \langle \text{Filter}(x,c,.,.), \text{FeatureMap}(x,c,.,.) \rangle \quad (1)$$

where <.,.> denotes an inner product operation, $\text{Filter}(x, c,.,.) \in \mathbb{R}^{k \times k}$ denotes a k×k array of convolutional filter parameters spatial position x and associated with channel c, and $\text{FeatureMap}(x, c,.,.) \in \mathbb{R}^{k \times k}$ denotes the k×k unfolded features of the feature map at spatial position x and associated with channel c. Applying the convolutional filters to the feature map in this manner is equivalent to performing a 2D depth-wise spatial convolution operation on the feature map without the feature map having been unfolded.

The updated feature map can be represented, e.g., by an array of numerical values having dimensionality [sH]×[sW]×C, where [•] is an appropriate integer quantization operation, e.g., a floor operation.

At each spatial position in the feature map, the convolutional filter applied to the feature map at the spatial position is parametrized by a respective set of convolutional filter parameters that are generated by processing data representing the spatial position using the hyper neural network. In contrast to a conventional convolutional layer, which may apply the same convolutional filter to every spatial position in a feature map, the continuous up-sampling layer applies a position-specific convolutional filter to each spatial position in the feature map, which can allow the continuous up-sampling layer to perform detailed and fine-grained operations on the feature map to enhance the clarity of the up-sampled image. An example process for generating a set of convolutional filter parameters parameterizing a convolutional filter at a spatial position in the feature map using the hyper neural network is described in more detail with reference to FIG. 3. The convolutional filter parameters can be precomputed or can be dynamically generated by the hyper neural network, as described in FIG. 1.

The system processes the updated feature map using a projection subnetwork of the super-resolution neural network to generate the up-sampled image (208). For instance, for each spatial position in the updated feature map, the projection subnetwork can process the set of features corresponding to the spatial position in the updated feature map using the projection subnetwork to generate one or more intensity values of a pixel (voxel) at the spatial position in the up-sampled image. The one or more intensity values can be, e.g., red-green-blue (RGB) values defining a color of the pixel (voxel) at the spatial position in the up-sampled image. The projection subnetwork can have any appropriate neural network architecture, and in particular, can include any appropriate types of neural network layers (e.g., fully connected layers, convolutional layers, attention layers, and so forth) in any appropriate number (e.g., 1 layer, or 5 layers, or 10 layers) and connected in any appropriate configuration (e.g., as a directed graph of layers). A particular example implementation of a projection subnetwork is illustrated in FIG. 5.

The system outputs the up-sampled image generated by the super-resolution neural network (210).

FIG. 3 is a flow diagram of an example process 300 for generating one or more convolutional filter parameters for a spatial position in a feature map using a hyper neural network. For convenience, the process 300 will be described as being performed by a system of one or more computers located in one or more locations. For example, a super-resolution system, e.g., the super-resolution system 100 of FIG. 1, appropriately programmed in accordance with this specification, can perform the process 300.

The system receives a network input for the hyper neural network that includes data identifying a spatial position in a feature map that is received as a layer input of a continuous up-sampling layer in a super-resolution neural network, as described above with reference to FIG. 2 (302). The data identifying the spatial position can include, e.g., data identifying coordinates (e.g., x-y coordinates or x-y-z coordinates) in an appropriate coordinate system (e.g., a Cartesian coordinate system).

Optionally, the network input can include more than the data identifying the spatial position in the feature map. For instance, the network input can include data defining an up-sampling factor (as described above). As another example, the network input can include data identifying an index specifying a proper subset of a set of convolutional filter parameters for the spatial position. More specifically, the spatial position can be associated with a set of convolutional filter parameters, e.g., a set of $C \times k^2$ convolutional filter parameters parameterizing a 2D depth-wise convolution, as described above with reference to step 204 of FIG. 2. The set of convolutional filter parameters can be partitioned (divided) into proper subsets, each of which is indexed by a respective index. For instance, a set of $C \times k^2$ convolutional filter parameters can be indexed by $k^2$ unique indices, each of which specifies C convolutional filter parameters from the set of convolutional filter parameters. The hyper neural network can be configured to generate only the proper subset of convolutional filter parameters specified by the index included in the network input, rather than simultaneously generating the entire set of convolutional filter parameters, as will be described in more detail below.

Optionally, the system applies a transformation operation the spatial position data, e.g., to cause the convolutional filter parameters generated by the hyper neural network to be translation invariant with respect to the up-sampling factor (304). For instance, the system can transform spatial position data x to generate transformed spatial position data x' in accordance with the following equation:

$$x' = \frac{\text{mod}(x, s)}{s} \quad (2)$$

where mod(•) is a modulo operation and s is the up-sampling factor. Transforming the spatial position data as described in equation (2) can cause values of convolutional filter parameters generated by the hyper neural network to be periodic, such that the same convolutional filter parameter values are produced for multiple spatial locations in the feature map.

Optionally, the system applies positional encoding to data included in the network input (306). More specifically, the system can encode the numerical values included in the network input (e.g., numerical values defining one or more of: the spatial position, the up-scaling factor, and the index specifying the subset of convolutional filter parameters) using an encoding operation. The encoding operation can map each numerical value included in the network input to a higher-dimensional space, e.g., using a mapping that involves a periodic function such as a sine or cosine function. Encoding the numerical values in the network input in this manner can enable the hyper neural network to learn to represent signals with high-frequency variation and overcome a bias of neural networks for learning low-frequency functions.

The system can apply any appropriate positional encoding to the numerical values included in the layer input. For instance, the system can generate a cosine positional encoding $\Pi(z)$ of a numerical value z as:

$$\Pi(z) = \left\{ \cos\left( \frac{2z+1}{2} f_n \pi \right) \right\}_{n=1}^{N} \qquad (3)$$

where $\{f_n\}$ are scalar values sampled uniformly in the range $[0, f_{max}]$, and the vector expressed in equation (3) is sorted (e.g., from highest to lowest value, or from lowest to highest value). Other examples of positional encoding techniques are described in: Ben Mildenhall et al., "Nerf: representing scenes as neural radiance fields for view synthesis," ECCV, 2020; and Matthew Tancik et al., "Fourier features let networks learn high frequency functions in low dimensional domains," NeurIPS, 2020.

The system processes the network input using the hyper neural network to generate a network output that defines a respective value of one or more convolutional filter parameters of a convolutional filter for the spatial location (308). In some implementations, the hyper neural network generates the entire set of convolutional filter parameters for the spatial location simultaneously, e.g., as part of the same network output. In some implementations, the network input includes an index specifying a proper subset of the set of convolutional filter parameters (as described above at step 302), and the network output includes only the proper subset of the convolutional filter parameters specified by the index. In these implementations, the system can perform the process 300 multiple times, each time including a different convolutional filter parameter index in the network input, to generate the full set of convolutional filter parameters.

The system outputs the set of convolutional filter parameters generated by the hyper neural network for the spatial position (310). In particular, the system can provide the set of convolutional filter parameters for use in parametrizing the continuous up-sampling layer of the super-resolution neural network, as described above with reference to FIG. 2.

The spatial position data provided as an input to the process 300, for the purpose of generating convolutional filter parameters for parametrizing the super-resolution neural network, will generally be discrete spatial position data indexing a discrete spatial position in the feature map (i.e., because the feature map defines a discrete grid of features). However, the hyper neural network can receive and process spatial positions selected from a continuous space of possible spatial positions, e.g., a 2D space of possible spatial positions (e.g., $\mathbb{R}^2$) or a 3D space of possible spatial positions (e.g., $\mathbb{R}^3$). Thus the hyper neural network encodes a continuous family of convolutional filter parameters, which can encourage spatial correlation among the convolutional filters.

During training, the set of neural network parameters of the hyper neural network are iteratively adjusted, and consequently the values of the sets of convolutional filter parameters generated by the hyper neural network vary over the course of training. After training, the values of the set of neural network parameters of the hyper neural network may be fixed. Thus, for a given up-sampling factor and given up-sampled image resolution, the system can optionally precompute the values of the convolutional filter parameters used by the continuous up-sampling layer. For the given up-sampling factor and up-sampled image resolution, the continuous up-sampling layer can use the precomputed values of the convolutional filter parameters rather than relying on the values of the convolutional filter parameters being dynamically generated using the hyper neural network.

Further, as will be described in more detail below, the convolutional filter parameter values generated by the hyper neural network can have periodicity, e.g., as a result of a transformation operation applied to the spatial position data as described in equation (2), such that the same convolutional filter parameter values are produced for multiple spatial locations in the feature map processed by the continuous up-sampling layer. Therefore the system can precompute and store a number of convolutional filters that is significantly lower than the number of spatial positions in the feature map. For instance, in cases where the up-sampling factor s is an integer value and the system transforms the spatial position data in accordance with equation (2) (or in another appropriate way), the system may be required to precompute and store only $s^2$ distinct convolutional filters.

Figure 4:
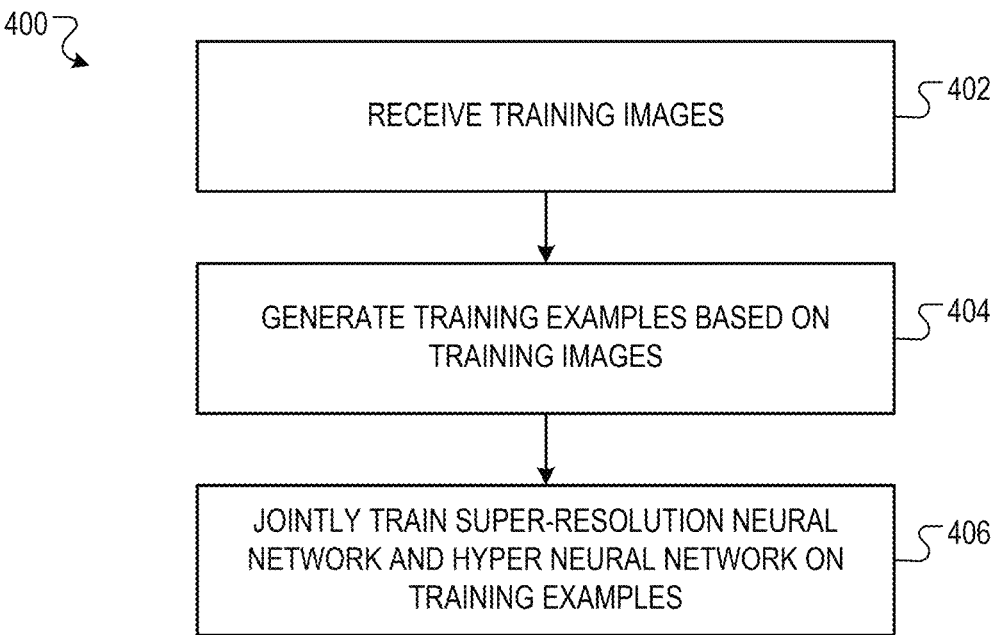
FIG. 4 is a flow diagram of an example process for jointly training a super-resolution neural network and a hyper neural network.

FIG. 4 is a flow diagram of an example process 400 for jointly training a super-resolution neural network and a hyper neural network. For convenience, the process 400 will be described as being performed by a system of one or more computers located in one or more locations. For example, a super-resolution system, e.g., the super-resolution system 100 of FIG. 1, appropriately programmed in accordance with this specification, can perform the process 400.

The system receives a set of training images (40). The set of training images can include any appropriate number of training images, e.g., 1000, or 100,000, or 1 million training images.

The system generates a set of training examples based on the set of training images (404). Each training example corresponds to a training image and includes: (i) a training input to the co-folding system, and (ii) a target up-sampled image. For each training example, the training input can include a down-sampled image that is a down-sampled version of the corresponding training image and an up-sampling factor specifying an amount of up-sampling required to restore the resolution of the down-sampled image to the resolution of the training image. The target up-sampled image is the training image itself. In some cases, the system generates multiple training examples from a single training image, where each of the training examples is associated with a respective up-sampling factor.

The system jointly trains the super-resolution neural network and the hyper neural network on the set of training examples, by a machine learning training technique, to optimize a super-resolution objective function (406). More specifically, for each training example, the system processes the training input from the training example using the super-resolution neural network, while the continuous up-sampling layer of the super-resolution neural network is parameterized by convolutional filter parameters generated in accordance with the current values of the set of hyper network parameters, to generate a predicted up-sampled image. The system then evaluates a super-resolution objective function that measures an error (e.g., a mean squared error) between: (i) the target up-sampled image of the training example, and (ii) the predicted up-sampled image. The system determines gradients of the objective function with respect to the current values of the set of super-resolution neural network parameters and the set of hyper neural network parameters, e.g., using backpropagation. The system then adjusts the current values of the super-resolution neural network parameters and the hyper neural network parameters using the gradients, e.g., by the update rule of an appropriate gradient descent optimization algorithm, e.g., RMSprop or Adam. In particular, the system back-propagates gradients of the objective function through the super-resolution neural network and into the hyper neural network.

Figure 5:
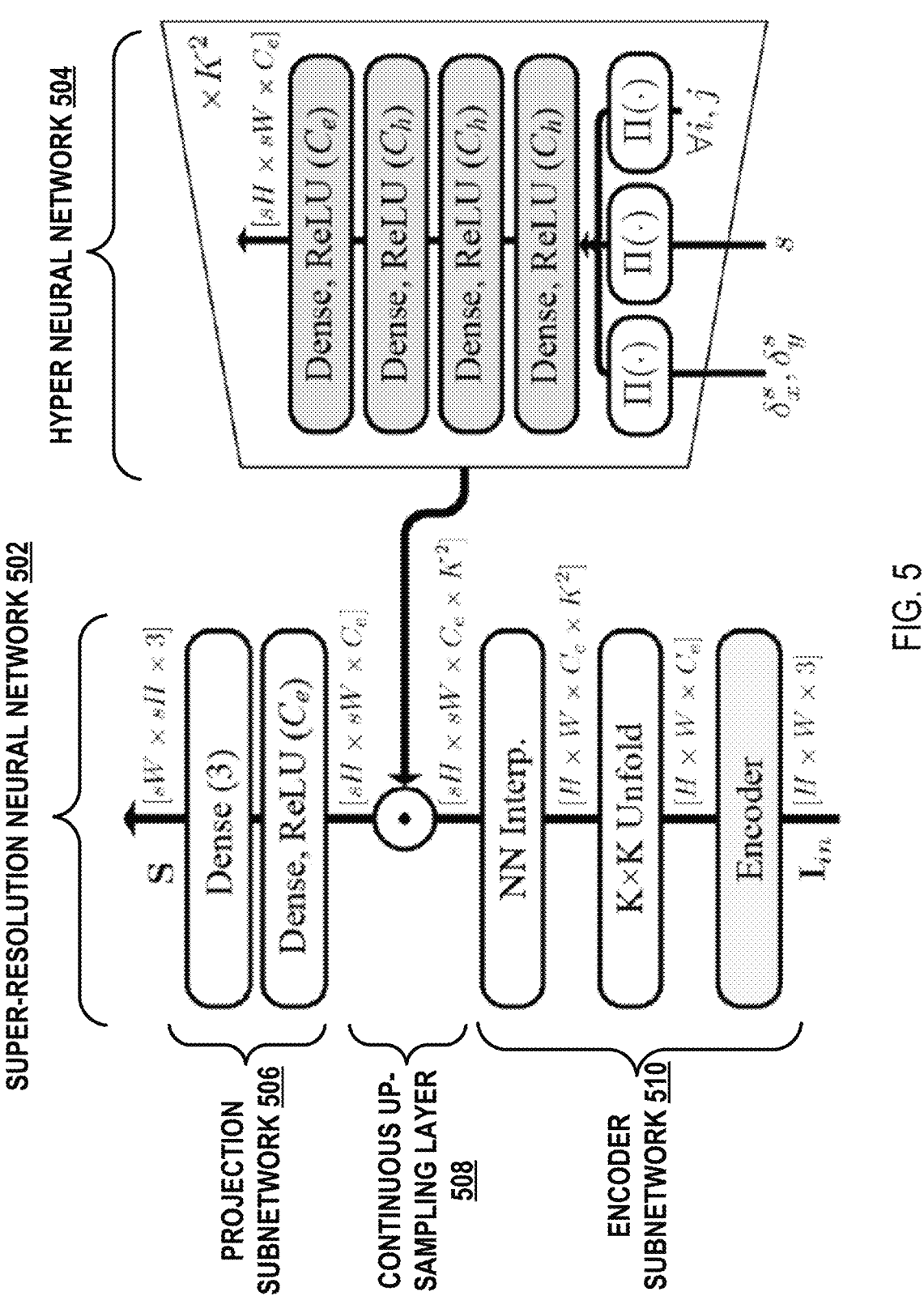
FIG. 5 shows a particular example architecture of the super-resolution neural network and the hyper neural network.

FIG. 5 shows a particular example architecture of the super-resolution neural network 502 and the hyper neural network 504. In this example, the encoder subnetwork 510 of the super-resolution neural network 502 includes an encoder layer ("Encoder", e.g., implemented as a convolutional neural network layer) that processes the input image to generate an initial feature map, a layer that unfolds the initial feature map ("K×K Unfold") and a layer than performs nearest neighbor interpolation to up-sample the initial feature map to the same resolution as the output image ("NN Interp"). The continuous up-sampling layer 508 applies the convolutional filters generated by the hyper neural network 504 to the feature map. The projection subnetwork 506 includes a dense layer ("Dense") followed by a rectified linear unit (ReLU) non-linearity ("ReLU") followed by another dense layer ("Dense (3)"). The hyper neural network 504 processes spatial position data ("$\delta_x^s$, $\delta_y^s$", e.g., that has been transformed in accordance with equation (2)), an up-sampling factor ("s") and indices specifying a proper subset of the full set of convolutional filter parameters ("i,j"). The hyper neural network 504 performs positional encoding of its inputs ("Π"), and includes a sequence of dense neural network layers interleaved with ReLU non-linearities.

Figure 6:
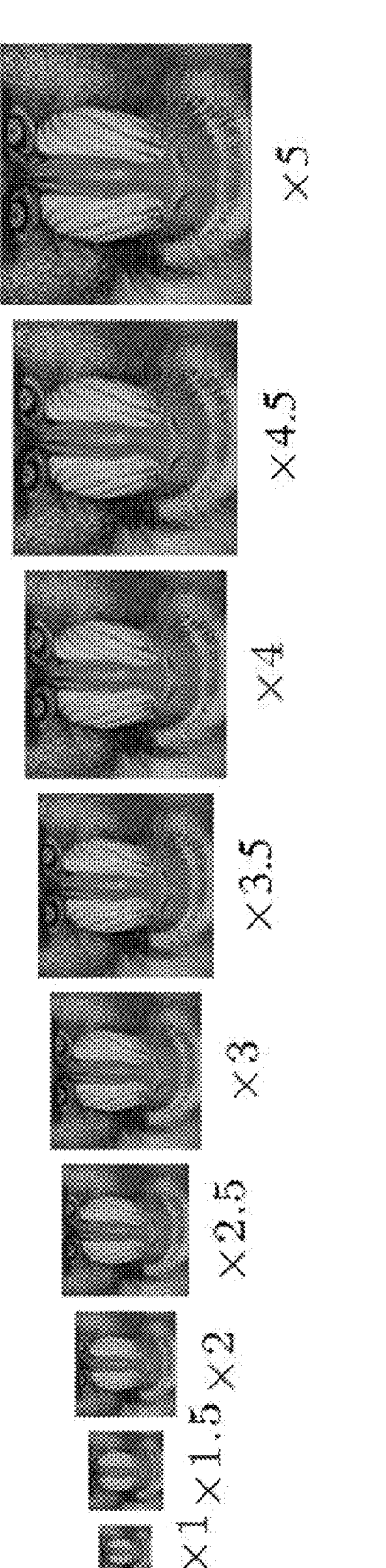
FIG. 6 illustrates an example of image super-resolution performed by the super-resolution system.

FIG. 6 illustrates an example of image super-resolution performed by the super-resolution system described in this specification. The original image is up-sampled by the super-resolution system by a series of increasing up-sampling factors, e.g., 1.5, 2, 2.5, 3, 3.5, 4, 4.5, and 5.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, specialpurpose hardware accelerator units for processing common and compute-intensive parts of machine learning training or production, i.e., inference, workloads.

Machine learning models can be implemented and deployed using a machine learning framework, e.g., a TensorFlow framework, or a Jax framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:

receiving an input image and an up-sampling factor;

processing the input image using a super-resolution neural network to generate an up-sampled image that is a higher resolution version of the input image, comprising:

processing the input image using an encoder subnetwork of the super-resolution neural network to generate a feature map;

generating an updated feature map, comprising, for each spatial position in the updated feature map:

applying a convolutional filter to the feature map at the spatial position to generate a plurality of features corresponding to the spatial position in the updated feature map, wherein the convolutional filter is parametrized by a set of convolutional filter parameters that are generated by processing data comprising (i) data representing the spatial position, and (ii) the up-sampling factor, using a hyper neural network; and processing the updated feature map using a projection subnetwork of the super-resolution neural network to generate the up-sampled image.

2. The method of claim 1, wherein the hyper neural network is configured to receive an input comprising an input spatial position, wherein the input spatial position is selected from a continuous space of possible spatial positions.

3. The method of claim 1, wherein the up-sampling factor is selected from a continuous range of possible up-sampling factors.

4. The method of claim 1, wherein the up-sampling factor defines a ratio of: (i) a resolution of the up-sampled image, and (ii) a resolution of the input image.

5. The method of claim 1, wherein the hyper neural network is configured to receive an input that comprises an index of one or more convolutional filter parameters; and wherein the hyper neural network is configured to generate an output that comprises one or more convolutional filter parameters corresponding to the index included in the input to the hyper neural network.

6. The method of claim 5, wherein processing data comprising (i) data representing the spatial position, and (ii) the up-sampling factor, using the hyper neural network to generate the convolutional filter comprises, for each convolutional filter parameter in the convolutional filter:

processing an input comprising: (i) data representing the spatial position, and (ii) an index corresponding to the convolutional filter parameter, using the hyper neural network to generate the convolutional filter parameter corresponding to the index.

7. The method claim 1, wherein the hyper neural network is configured to apply positional encoding to inputs to the hyper neural network.

8. The method of claim 7, wherein the positional encoding is a cosine positional encoding.

9. The method of claim 1, wherein for each spatial position in the updated feature map, the convolutional filter corresponding to the spatial position is a two-dimensional convolutional filter.

10. The method of claim 1, wherein processing the input image using the encoder subnetwork of the super-resolution neural network to generate the feature map comprises:

processing the input image to generate a feature map having a same resolution as the input image; and transforming the feature map to have a same resolution as the up-sampled image.

11. The method of claim 10, wherein transforming the feature map to have the same resolution as the up-sampled image comprises:

up-sampling the feature map using nearest-neighbor interpolation.

12. The method of claim 10, wherein processing the input image to generate a feature map having a same resolution as the input image comprises:

unfolding the feature map to augment each spatial position in the feature map with features from neighboring spatial positions in the feature map.

13. The method of claim 1, wherein processing the updated feature map using the projection subnetwork of the super-resolution neural network to generate the up-sampled image comprises, for each spatial position in the updated feature map:

processing the plurality of features corresponding to the spatial position in the updated feature map using the projection subnetwork to generate one or more intensity values of a pixel at the spatial position in the up-sampled image.

14. The method of claim 1, wherein input image is a two-dimensional color image.

15. The method of claim 1, wherein the input image comprises a medical image.

16. The method of claim 1, further comprising:

determining gradients of a super-resolution objective function with respect to: (i) a set of parameters of the super-resolution neural network, and (ii) a set of parameters of the hyper neural network, wherein the super-resolution objective function measures an error in the up-sampled image; and updating current values of: (i) the set of parameters of the super-resolution neural network, and (ii) the set of parameters of the hyper neural network, using the gradients.

17. The method of claim 16, wherein updating current values of: (i) the set of parameters of the super-resolution neural network, and (ii) the set of parameters of the hyper neural network, using the gradients comprises:

backpropagating the gradients through the super-resolution neural network and the hyper neural network.

18. A system comprising:

one or more computers; and one or more storage devices communicatively coupled to the one or more computers, wherein the one or more storage devices store instructions that, when executed by the one or more computers, cause the one or more computers to perform operations comprising:

receiving an input image and an up-sampling factor;

processing the input image using a super-resolution neural network to generate an up-sampled image that is a higher resolution version of the input image, comprising:

processing the input image using an encoder subnetwork of the super-resolution neural network to generate a feature map;

generating an updated feature map, comprising, for each spatial position in the updated feature map:

applying a convolutional filter to the feature map to generate a plurality of features corresponding to the spatial position in the updated feature map, wherein the convolutional filter is parametrized by a set of convolutional filter parameters that are generated by processing data comprising (i) data representing the spatial position, and (ii) the up-sampling factor, using a hyper neural network; and processing the updated feature map using a projection subnetwork of the super-resolution neural network to generate the up-sampled image.

19. One or more non-transitory computer storage media storing instructions that when executed by one or more computers cause the one or more computers to perform operations comprising:

receiving an input image and an up-sampling factor;

processing the input image using a super-resolution neural network to generate an up-sampled image that is a higher resolution version of the input image, comprising:

processing the input image using an encoder subnetwork of the super-resolution neural network to generate a feature map;

generating an updated feature map, comprising, for each spatial position in the updated feature map:

applying a convolutional filter to the feature map to generate a plurality of features corresponding to the spatial position in the updated feature map, wherein the convolutional filter is parametrized by a set of convolutional filter parameters that are generated by processing data comprising (i) data representing the spatial position, and (ii) the up-sampling factor, using a hyper neural network; and processing the updated feature map using a projection subnetwork of the super-resolution neural network to generate the up-sampled image.

20. The one or more non-transitory computer storage media of claim 19, wherein the hyper neural network is configured to receive an input comprising an input spatial position, wherein the input spatial position is selected from a continuous space of possible spatial positions.

* * * * *